April 16, 1968 G. F. DALES 3,378,660
THERMOSTAT
Filed June 7, 1965 3 Sheets-Sheet 1
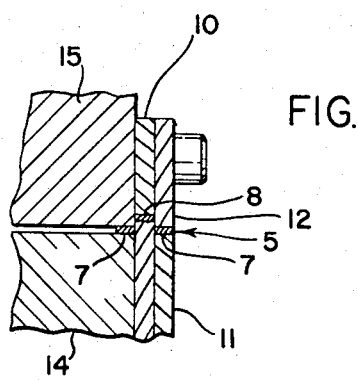
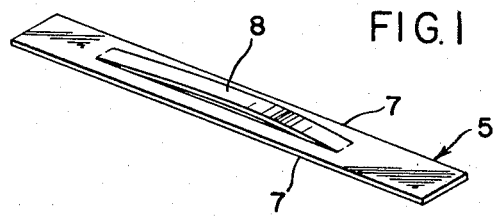
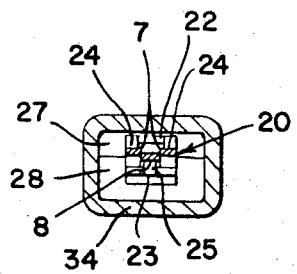
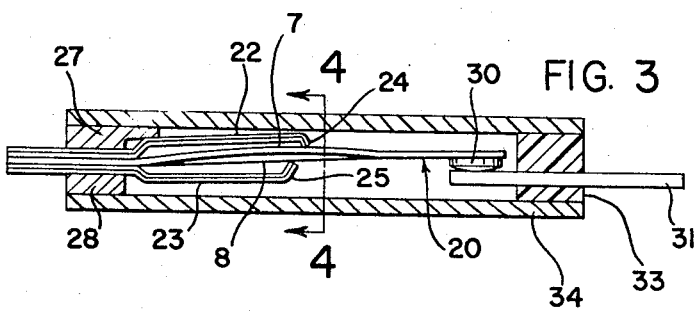
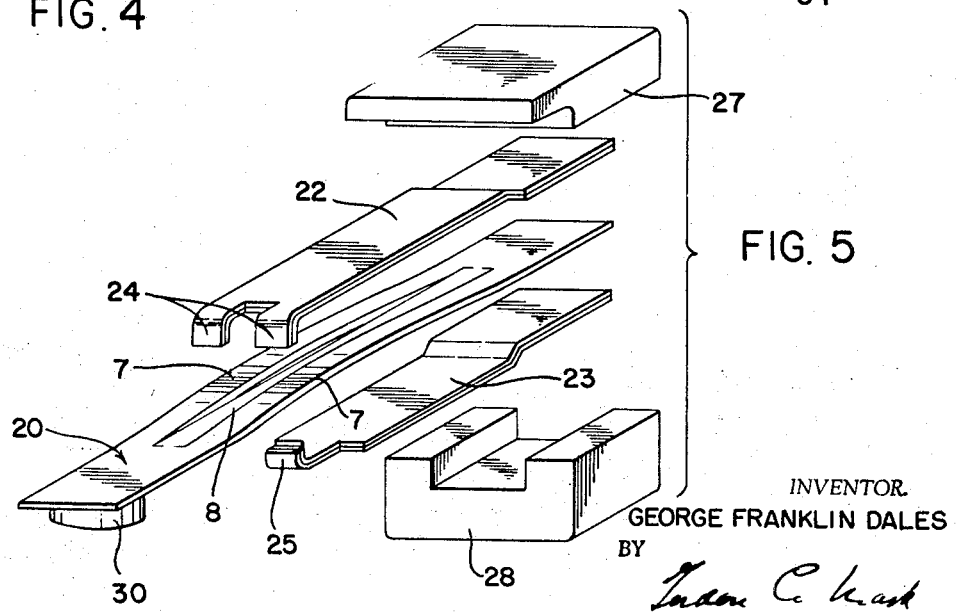
INVENTOR.
GEORGE FRANKLIN DALES
BY
ATTORNEY April 16, 1968 — G. F. DALES — 3,378,660

THERMOSTAT

Filed June 7, 1965

INVENTOR.
GEORGE FRANKLIN DALES
BY
ATTORNEY

*INVENTOR.*
GEORGE FRANKLIN DALES
BY
ATTORNEY

United States Patent Office 3,378,660
Patented Apr. 16, 1968

3,378,660
THERMOSTAT
George Franklin Dales, Akron, Ohio, assignor to The Franklin Dales Company, Akron, Ohio, a corporation of Ohio
Continuation-in-part of abandoned application Ser. No. 401,288, Sept. 24, 1964. This application June 7, 1965, Ser. No. 461,830
Filed June 7, 1965, Ser. No. 461,830
8 Claims. (Cl. 200—138)

ABSTRACT OF THE DISCLOSURE

A thermostat with two bimetals and a snap element and a pressure element which presses one bimetal toward the snap element with a portion of the snap element and a portion of each of the bimetals and the pressure element held in a fixed relation. A contact area on the snap element is adapted to be snapped into and out of contact with another contact area.

---

This application is a continuation-in-part of my application Ser. No. 401,288 filed Sept. 24, 1964 (now abandoned) which, in turn, is a continuation-in-part of my application Ser. No. 135,318 filed Aug. 31, 1961 (now abandoned).

This invention relates to a thermostat.

The thermostat includes a snap element composed of bowed and unbowed portions, which is used to make and break the electric current passed through the thermostat. Bimetals contact opposite sides of the snap element, one being in contact with the bowed portion and the other being in contact with the unbowed portion to snap the bowed portion from one position to the other and thus make or break the circuit. Saddle blocks or other suitable means are used to apply pressure to at least one of the bimetals, and the thermostat is calibrated by regulating this pressure the thermostat may be enclosed in a casing, and may be calibrated before or after being positioned within the casing.

The snap element is advantageously made from a leaf spring. The bowed portion is connected at both ends to the unbowed body portion of the element, and is adapted to be snapped from one side of the unbowed portion to the other, thereby snapping one end of the snap element into or out of contact with another contact point whereby the circuit through the thermostat is instantaneously completed or broken. Various types of such snap elements are known in the art.

Preferably the outer ends of the bimetals terminate in the same plane, adjacent to one another. The bimetals are then preferably of different lengths so that they contact opposite sides of the snap element at different distances from the end of the thermostat, although this is not essential. If the bimetals are of the same composition, they are preferably of different lengths. A contact button is fixed to one end of the snap element. If the thermostate is to be opened when a maximum temperature has been reached the contact button is fixed to the opposite side of the snap element from the bow, and that situation is illustrated in the drawings. If the thermostat is to operate cooling means and to close when a minimum temperature has been reached the contact button is on the same side of the snap element as the bow. There is more travel per degree rise or lowering in the longer element so this longer element contacts the opposite side of the snap element from the button in order to take advantage of this faster action in snapping the element. If the bimetals are of different compositions the bimetal which contacts the bowed portion of the snap element may not be the longer, but it is desirable to fabricate the thermostat so that pressure applied to the snap element is as rapid as possible.

The snap element is preferably formed by stretching and bowing one portion. This portion may be located at one side of the unbowed portion of the element, but preferably the unbowed portion is bounded on both sides by uniformly bowed portions of the element, or two unbowed portions may be located on opposite sides of a bowed portion.

The thermostat is calibrated by regulating the pressure applied to that bimetal which contacts the bowed portion of the snap element. This is done by providing a pressure element which is entirely separate from the casing so that a casing is not necessary, and if a casing is provided the thermostat may be calibrated either before or after being located within the casing.

The invention will be further described in connection with the accompanying drawings, in which FIGURE 1 is a view in perspective of a snap element;

FIGURE 2 is a vertical section through a preferred type of equipment for the manufacture of such a snap element;

FIGURE 3 is a vertical section through a thermostat equipped at one end with blocks which function in the manner provided by the invention;

FIGURE 4 is a vertical section on line 4—4 of FIGURE 3;

FIGURE 5 is an exploded view of the contents of the thermostat;

Figure 6:
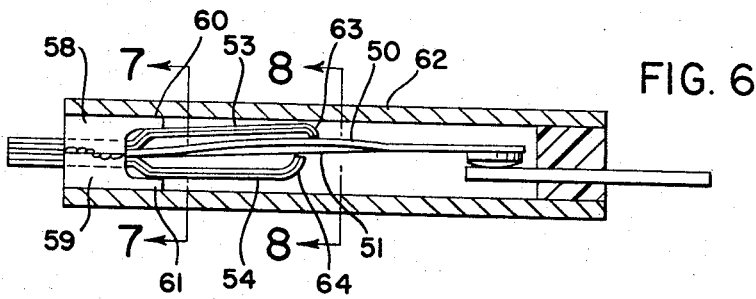
FIGURE 6 is a section through a thermostat of modified construction.
Figure 7:
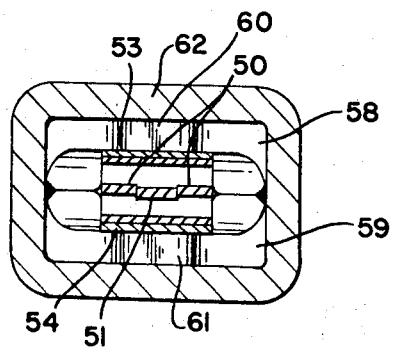
Figure 8:
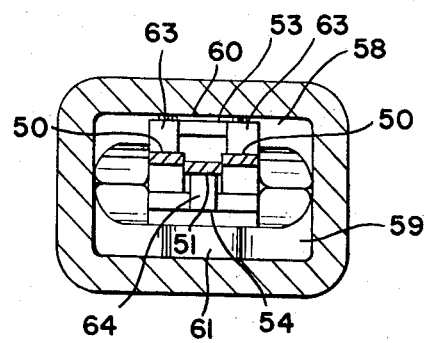
Figure 9:
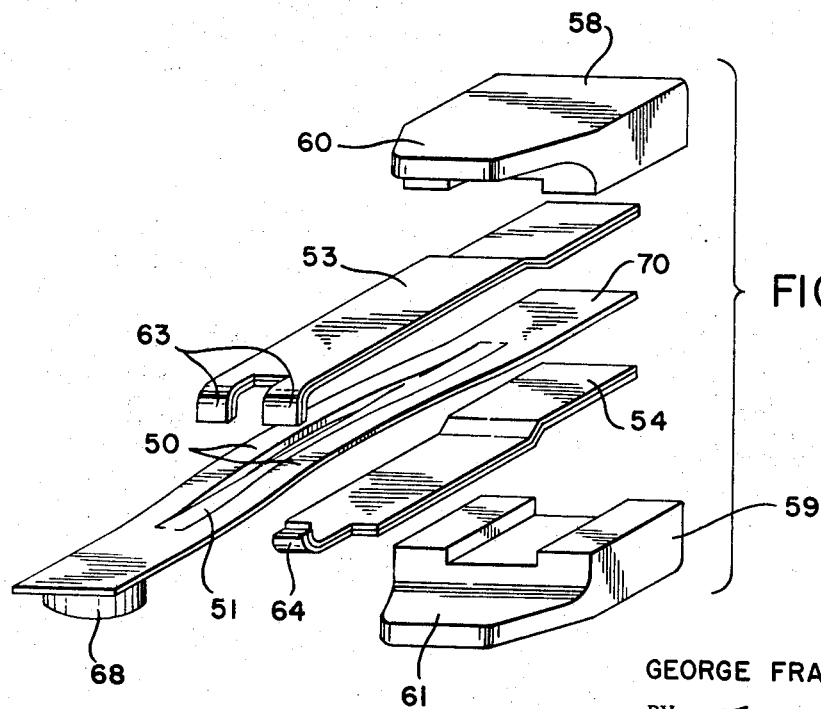
Figure 10:
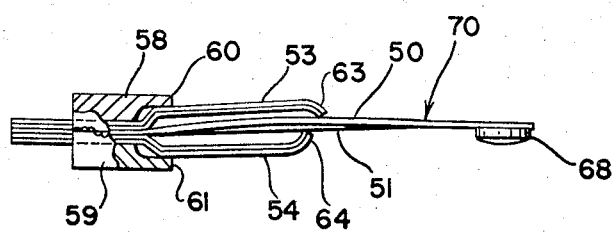
Figure 11:
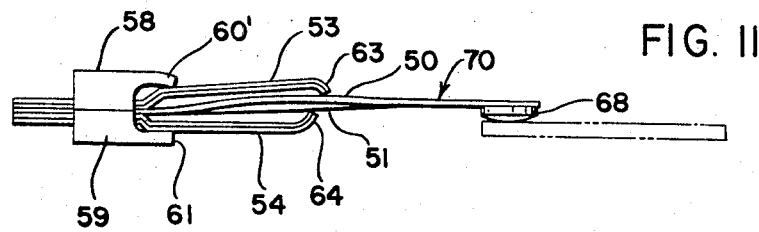
Figure 12:
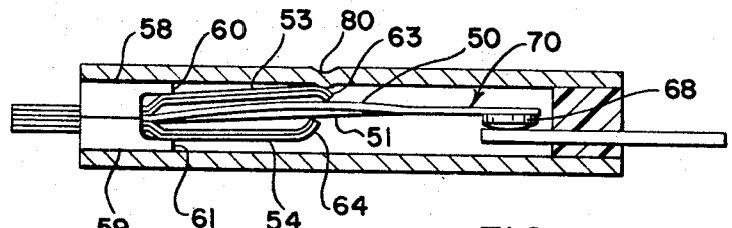

FIGURES 7 and 8 are vertical sections on lines 7—7 and 8—8, respectively, of FIGURE 6;

FIGURE 9 is an exploded view of the contents of this thermostat;

FIGURE 10 is a view of the snap element assembly before being inserted in the thermostat casing;

FIGURE 11 is a vertical section through this assembly and a calibrating block, showing how by calibration pressure can be applied to the bimetal which contacts the bowed portion of the snap element; and FIGURE 12 is a vertical section through this thermostat and calibrating means, showing how by calibration pressure can be applied to the bimetal which contacts the unbowed portion of the snap element.

FIGURE 1 shows the snap element 5 with parallel slits within it, which separate the edge portions 7 from the bowed portion 8.

FIGURE 2 is a sectional view of a device designed to cut parallel slits in a leaf of a bimetal, and stretch the strip that is thus separated. The blade 10 is located between the jaws 11 and 12 on one side, and the jaws 14 and 15 on the other side. The blade cuts two parallel slits of the required length in the metal leaf 5, and an upwardly curved area of its lower portion presses the severed middle portion of the leaf against the hollowed-out under-surface of the upper portion and stretches and bows it. Usually a silver contact point is attached to one end of this element.

In FIGURE 1 the bowed portion of the snap element is located centrally. It might be located in any convenient place. The snap element need not be elongated but may be circular or oval with the central portion bowed.

The snap element shown in FIGURES 6 to 12 is different, because the outside strips are stretched and bowed, and the inside strip is unbowed. The amount the bowed portion is stretched determines how much it is bowed. The art has utilized other means for fabricating a snap element in which there is a bowed portion and in some instances this has been stretched. Such snap elements may be used. Usually the snap element is made of copper, but it may be made of beryllium, phosphor bronze or copper-nickel, etc., and may be .003 to .025 inch thick. Usually it will be no longer than one inch and not over ⅛ inch wide.

The thermostat of FIGURES 3–5 includes the snap element 20, the bimetals 22 and 23, each with one end turned up at 24 and 25, the saddle block retainers 27 and 28, the button 30, the terminal contact 31, the molded insulator 33 and the casing 34. The terminal contact 31 is held in the molded insulator in one end of the case. This insulator may be of any suitable composition. The element 20 is held between the bimetals 22 and 23, between the saddle block retainers 27 and 28. These are not insulators but are advantageously made of steel. The bimetal 22 which contacts the bowed side portions 7, 7 of the snap element is slightly longer than the bimetal 23 which contacts the unbowed portion 8, and applies a regulated amount of pressure to it.

By reversing the position of the interior of the thermostat in its casing, and putting the button 30 on the opposite side of the snap element, the thermostat may be used to operate an air-conditioning element to maintain a temperature below atmospheric.

FIGURE 3 shows the thermostat as closed so that current is passing through the device in which it is located. When it becomes heated to the temperature at which the bimetals 22 and 23 apply sufficient pressure to the different portions of the element 20, the portion 8 snaps to the oppositely bowed position and this lifts the button 30 from the terminal contact 31, and breaks the circuit. As the thermostat cools off, the bimetals gradually separate, reducing the pressure applied to the element 20 until the bowed portion 8 snaps back to the position shown in FIGURE 3, re-establishing the circuit. Thus, the circuit is opened and closed, and a relatively constant temperature is maintained.

The bimetal 22 contacts the snap element at a greater distance from the place where the bimetals and snap element are held together, than the bimetal 23, and it contacts the side of the snap element on the side opposite the button 30. As the temperature rises and the bimetals bend toward the snap element, the end 24 of the longer bimetal 22 travels faster than the end 25 of the shorter bimetal 23. This causes quicker separation of the button 30 from electrode 31 than if the bimetals were the same length or element 22 were shorter than element 23, and this is advantageous.

It is evident from the drawing, that the bowing of the middle portion of the snap element causes the side portions to be permanently bent or bowed to a lesser degree.

The thermostat of FIGURES 6–9 is provided with saddle blocks having tongues in contact with both bimetals, and this not only makes it possible to calibrate the thermostat by applying pressure to either bimetal or both bimetals, but also the blocks are identical so that inventory and assembly are simplified, reducing costs.

The side strips 50 of the snap element are bowed, and the center strip 51 is not bowed. The bimetals 53 and 54 are similar to those shown in FIGURES 3–5 and operate in the same manner. The blocks 58, 59 are made of steel or other bendable material which retains its shape after bending. The blocks have tongues 60, 61 in pressure contact with the respective bimetals. The bent ends 63, 64 of the arched bimetals contact the bowed and unbowed portions 50 and 51, and by bending the tongue 60 against the bimetal 53, the thermostat is made to operate at a desired temperature.

The snap element and bimetals extend through the central portions of the blocks (as indicated by dotted lines in FIGURE 6) and may extend beyond the casing where contact for a wire connection is provided.

The structure shown in FIGURE 10 may be used without a casing, or it may be inserted in a casing as shown in FIGURES 6–9. It may be calibrated before being inserted in a casing (FIGURE 11) or afterwards (FIGURE 12). The assembly of FIGURE 10 is designed to control a temperature above ambient temperature, and by locating the button 68 on the opposite side of the snap element 70, it can be used for operating a cooling device to maintain a controlled temperature below ambient temperature.

The two saddle blocks 58 and 59 are cemented together and act as a unit. The tongues 60 and 61 are in contact with the respective bimetals 53 and 54 and after calibration maintain their upturned ends 63, 64 in pressure contact with the bowed and unbowed portions, respectively, of the snap element. By bending one of the tongues to the position 60' (FIGURE 11) pressure is increased on the bowed portions 50 of the snap element 70 and the temperature differential required to cause it to snap to the other side of the unbowed portion 51 is reduced. The temperature at which the bowed portion snaps is decreased by increasing the amount the tongue is bent (the amount being exaggerated in FIGURE 10), or it may be decreased by bending both tongues toward one another. Either tongue or both tongues are advantageously bent by applying controlled pressure to one or both bimetals while the blocks 58 and 59 are firmly held, and after the snap element and bimetals have been assembled within the blocks. Pressure is applied, and the tongue or tongues move the bent ends of the bimetals closer together, bringing the bowed portion of the snap element nearer to the snapping position. In calibration, the thermostat is heated to the temperature at which the thermostat is to snap, and then one or both tongues are bent sufficiently to cause the bowed element to snap. This may be at a temperature about atmospheric or a much higher temperature. In actual practice, if the thermostat is to be inserted into a casing, such calibration is usually done at about 10° F. above the temperature at which it is desired to have the thermostat snap, because there is a lag of about this many degrees when these elements are located in the casing. These thermostats may be constructed to open and close on a temperature differential of 10 or 20 or as much as 50° F. or more, and may carry heavy loads. The differential can be varied by varying the thickness or width of the bowed element, because the differential is dependent upon the pressure required to make the bowed element snap. They are capable of use in motors, water heaters, etc.

Alternatively, the thermostat may be calibrated after assembly (FIGURE 12). This is advantageously done by applying pressure at a point 80 in the casing above one of the tongues (or similarly applying pressure to both tongues), until the tongue has been bent the desired amount.

The bimetals are shaped appropriately to apply the desired varying pressures to the different portions of the snap element. If the outer ends of the bimetals are in contact with the two sides of the snap element, the bimetals are advantageously arched somewhat as illustrated. If the ends of the bimetals are separated from the end of the snap element, arching is not essential, although the contacting ends of the bimetals will be bent toward the snap element. A bimetal with one bent end can be used with an unbent bimetal. If the end of neither bimetal is bent toward the snap element the operation of the thermostat will not be very efficient.

The invention is covered in the claims which follow. What I claim is:

1. A thermostat assembly which includes
  (a) a snap element electrically conductive material having an unbowed portion and a bowed portion the ends of which are spaced from the end of the element,
  (b) two bimetals, and
  (c) a pressure element which presses one bimetal toward the snap element, with a portion of the snap element and a portion of each of the bimetals and the pressure element held in fixed relation, a contact area on the snap element away from said held portion adapted to be snapped into and out of contact with another contact area, with free ends of the bimetals in contact with opposite surfaces of the snap element, the free end of the first bimetal being in contact with the bowed portion of the snap element and the free end of the second bimetal being in contact with the unbowed portion of the snap element adjacent the bowed portion.

2. A thermostat which includes a casing and the assembly of claim 1 held in one end thereof.

3. The thermostat of claim 1 in which the snap element is an elongated element with a central unstretched portion separated by narrow slits from stretched portions on each side thereof which constitute the bowed portion of the snap element.

4. The thermostat of claim 2 in which the snap element, the bimetals and the casing are elongated, and one end of the snap element and each bimetal is held in one end of the casing.

5. The thermostat of claim 1 in which the end of the first bimetal moves farther in the direction of the snap element when the temperature changes one degree than the end of the second bimetal.

6. The thermostat of claim 5 in which there is a button on one side of the free end of the snap element to make and break contact with a terminal within the thermostat, and the first element contacts the other side of the snap element.

7. A thermostat which comprises a narrow leaf of uniform composition and parallel edges with a longitudinal slit therein parallel to the edges of the leaf which does not extend to the ends of the leaf, the leaf on one side of the slit being relatively flat and the portion on the other side stretched and bowed for substantially the length of the slit and adapted to be snapped from one side to the other of the plane of the relatively flat side, and two bimetals on opposite surfaces on the leaf and generally parallel thereto with one end of each adapted to contact the leaf on a different surface of the leaf and on a different side of the slit, with one end of the leaf and the other end of each of the two bimetals fastened in a fixed relation to one another.

8. A thermostat which comprises a case, two bimetals of different lengths held in one end of the case with their inner ends bent away from the case and adapted to move away from the case as their temperature is raised, a leaf of spring metal with two substantially parallel slits therein with the portion between the slits stretched and bowed with one end of the leaf held in said end of the case between said two bimetals, with the bent end of one bimetal adapted to contact the bowed portion of the element and the bent end of the other bimetal adapted to contact unbowed portions of the leaf at the sides of the bowed portion when the bimetals are heated, a contact at the inner end of the leaf and another contact within the thermostat with which the first contact is adapted to make and break contact as the temperature of the bimetals is changed.

References Cited

UNITED STATES PATENTS

| | | | |
|---|---|---|---|
| 2,189,996 | 2/1940 | Riche | 200—138.5 |
| 2,301,129 | 11/1942 | Lehmann. | |
| 2,340,056 | 1/1944 | Harrison | 200—138 |
| 2,497,397 | 2/1950 | Dales | 200—138.6 |
| 2,951,136 | 8/1960 | Wells | 200—138.6 |

BERNARD A. GILHEANY, *Primary Examiner.*

R. L. COHRS, *Assistant Examiner.*

UNITED STATES PATENT OFFICE
CERTIFICATE OF CORRECTION

Patent No. 3,378,660                            April 16, 1968

George Franklin Dales

It is certified that error appears in the above identified patent and that said Letters Patent are hereby corrected as shown below:

Column 4, line 66, after "element" insert -- of --.

Signed and sealed this 19th day of August 1969.

(SEAL)
Attest:

Edward M. Fletcher, Jr.                      WILLIAM E. SCHUYLER, JR.
Attesting Officer                                Commissioner of Patents